United States Patent
Tighe (10) Patent No.: US 8,331,538 B2
(45) Date of Patent: Dec. 11, 2012

(54) TELEPHONE PORT IDENTIFICATION AUTOMATIC DISCOVERY SYSTEM

(75) Inventor: James R. Tighe, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 1441 days.

(21) Appl. No.: 11/192,455

(22) Filed: Jul. 28, 2005

(65) Prior Publication Data

US 2007/0036319 A1    Feb. 15, 2007

(51) Int. Cl.
*H04M 1/24* (2006.01)
*H04M 3/08* (2006.01)
*H04M 3/22* (2006.01)

(52) U.S. Cl. ............... 379/29.06; 379/21; 379/25

(58) Field of Classification Search ............ 379/1.01, 379/15.03, 21, 25, 29.06, 29.1, 142.01, 142.06, 379/210.01; 370/352
See application file for complete search history.

(56) References Cited

U.S. PATENT DOCUMENTS

| | | | | |
|---|---|---|---|---|
| 5,857,011 | A | * | 1/1999 | Kennedy et al. ........... 379/29.06 |
| 6,005,921 | A | * | 12/1999 | Keefe et al. ................ 379/29.06 |
| 6,385,299 | B1 | | 5/2002 | Brooks et al. ..................... 379/9 |
| 6,628,756 | B2 | * | 9/2003 | Avitsur et al. ............. 379/27.01 |
| 7,286,646 | B2 | * | 10/2007 | Gunn et al. ...................... 379/22 |
| 7,385,973 | B1 | * | 6/2008 | Johnson et al. ............... 370/389 |
| 2002/0071440 | A1 | * | 6/2002 | Cerami et al. ................ 370/404 |

FOREIGN PATENT DOCUMENTS

EP    1 098 500 A2    5/2001

OTHER PUBLICATIONS

Cisco Systems; "VoIP Overview;" 2001; Downloaded May 10, 2005 from http://www.cisco.com/warp/public/779/servpro/solutions/wireless_mobile/kbs/voip_kb.html; 10 pages.
International Search Report for International Application No. PCT/US2006/030243; International Filing Date Jul. 28, 2006, Search Completed Nov. 21, 2006; 3 pages.

* cited by examiner

*Primary Examiner* — Quoc D Tran
(74) *Attorney, Agent, or Firm* — Campbell Stephenson LLP (57) ABSTRACT

A localized digital telephone network may automatically contact a centralized server to identify telephone numbers that connect the local network to a public switched telephone network (PSTN). The server may be a remote identification server that receives calls from local networks, and informs the local networks of the telephone numbers being used by the local networks. The server may capture caller-ID information of the incoming calls, and may return the calls with the captured information encoded in caller-ID signals of the return calls. A method for automated detection may include acts in which a local network generates an outgoing call to a server on a communications port, and then detects an incoming call from the server on the communications port. The local network may determine a caller identifier from the incoming call, and may map the caller identifier to the communications port.

32 Claims, 6 Drawing Sheets

TELEPHONE PORT IDENTIFICATION AUTOMATIC DISCOVERY SYSTEM

BACKGROUND

Digital signaling has become an increasingly important feature of telephone services. Standard telephone service may be provided by a public switched telephone network (PSTN). Services provided by a PSTN may generally include the routing and transmission of telephone calls, as well as various supporting services such as call forwarding, display of a caller's name and number, and three-way calling, among others. At the edge of a PSTN, a telephone service provider may provide service to customers through basic telephone channels over copper conductors. In such channels, a voltage signal may be used to represent an analog signal, such as a scalar time-varying sound pressure level of a person's voice. The PSTN may band-limit such signals to a 3 kHz bandwidth, so that several such signals may be multiplexed for efficiency on the PSTN's links.

Digital information may be used in a variety of aspects of a telephone network. Customers of a local exchange carrier may transmit digital data over basic telephone channels to a subscriber's site. For example, even basic band-limited channels may be used for modem signals, in which the voltage signal uses amplitude-shift, frequency-shift, or phase-shift keying (ASK, FSK, or PSK), or combinations thereof, to convey a stream of binary data. PSTN providers may also provide wider-bandwidth channels for subscribers, with greater capacities for voice and data signals. Examples of such higher-capacity services include integrated services digital network (ISDN) lines, digital subscriber loop (DSL) services, T-1 lines, and T-3 lines, among others. A general tool for identifying users of these services is the telephone number, which may identify individual subscriber ports assigned to a carrier's customers. Telephone numbers may have forms such as "1-408-555-4000," and may be assigned in conformance with various standards and conventions, such as the E. 164 standard set by the International Telecommunication Union (ITU) Telecommunication Standardization Sector (ITU-T).

Independently of their use at the edges of a PSTN by customers, digital signals may also be used at the heart of a PSTN network. For example, a local exchange carrier may digitize incoming telephone signals so that the signals may be more readily multiplexed and switched through the telephone network. The digital signals also allow use of fiber-optic networks, using on-off keying (OOK) to efficiently convey many multiplexed signals over long distances. The PSTN may transmit digital signals according to the Common Channel Signaling System No. 7 (i.e., SS7 or C7), a global telecommunications standard from the ITU-T. SS7 broadly establishes protocols for a PSTN to transmit signals over a digital network to set up, route, and control wireless (cellular) and wireline calls.

Digital signals are also used for telephony by individuals who may digitize voice signals for transmission over the Internet, with our without the use of a PSTN. Colloquially known as voice over internet protocol (VoIP) connections, these connections may make only incidental use of a PSTN, as in the case of two people who communicate with each other over the Internet using headsets and their personal computers. VoIP connections may also partly interact with a PSTN, as in the case where one person uses a headset and a personal computer to initiate a telephone call to a PSTN subscriber.

Yet another form of digital telephony is the use of localized digital telephone networks, which may or may not be connected to a PSTN. One form of a localized digital telephone network is an IP telephone system, which uses internet-related protocols such as the transmission control protocol (TCP) and the user datagram protocol (UDP) to convey voice signals among telephones connected to a digital network. The technology of an IP telephone system may also be called VoIP. Other forms of localized digital telephone network may use other, non-internet-related, protocols for communicating digitized voice signals.

Among the challenges faced by designers of new tools for digital telephony is the simplification of products, so that users may quickly and easily install, initiate, and use the products. This simplification is especially important to designers of systems intended for use by customers outside of the telecommunications industry. Consumers and small-business owners may benefit from careful design that makes their systems user friendly and easy to install.

For example, a small business may have several PSTN lines for use by the business's telephones. If the business purchases a localized digital telephone network, an initial challenge may be to connect the digital telephone network to the PSTN through the existing telephone lines. One task may be to determine which of several telephone numbers correspond to which of several port numbers used internally by the localized digital telephone network. Tools and procedures that simplify the interfacing of a localized digital telephone network to a PSTN may be valuable to users faced with the task of installing such a network.

DETAILED DESCRIPTION

Figure 1:
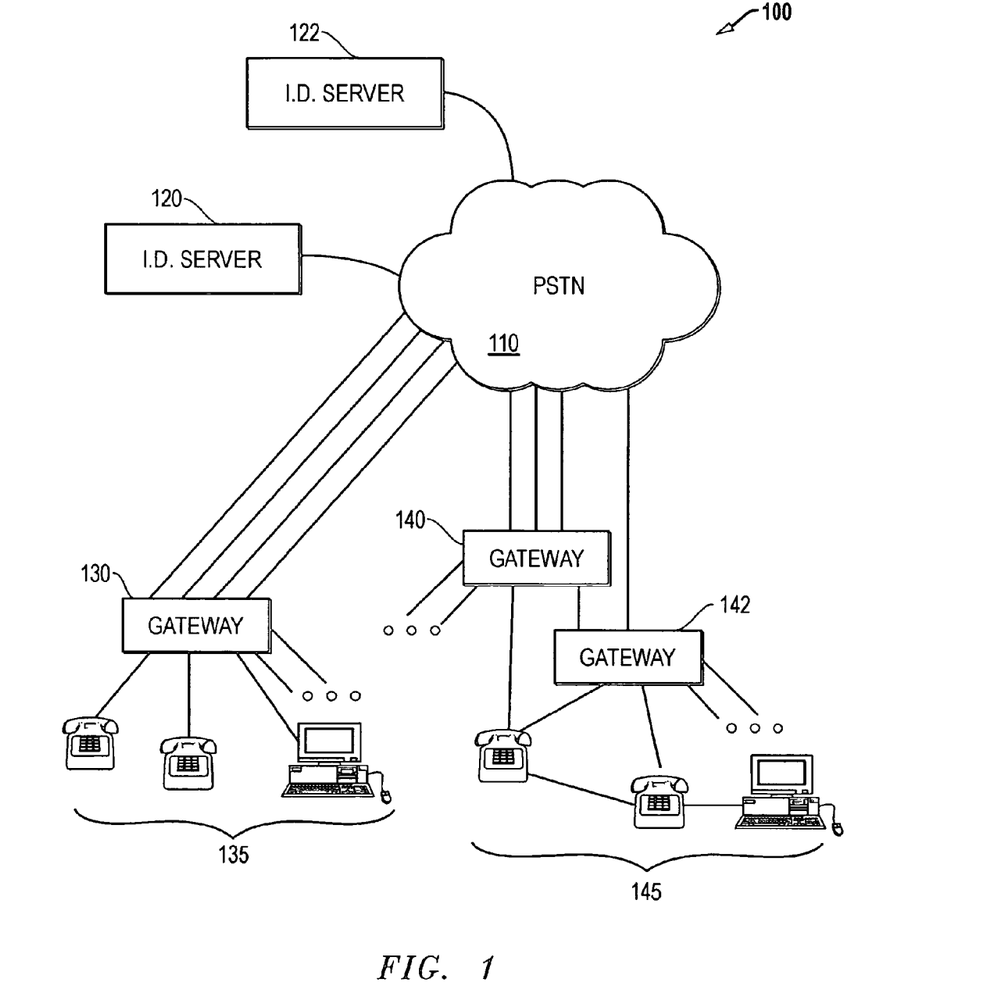
FIG. 1 is a block diagram of one view of a telephone network environment with a public switched telephone network and local networks.

FIG. 1 is a block diagram of one view of a telephone network environment 100. The environment 100 may include elements that allow local networks to identify automatically the telephone numbers of telephone lines connected to the local networks. The environment 100 may include ID servers 120 and 122 and local networks 135 and 145 coupled to a public switched telephone network (PSTN) 110. The local networks 135 and 145 may be localized digital telephone networks. Each of the ID servers and local networks may be coupled to the PSTN 110 through telephone lines. The telephone lines may be standard telephone services that use plain old telephone service (POTS) or higher capacity PSTN services, such as DSL service, ISDN service, T1 service, or others. As described below, the local networks 135 and 145 may dial in to the ID servers 120 and 122 during initial set-up procedures to discover the telephone numbers of the telephone lines that connect the local networks to the PSTN 110.

The local networks 135 and 145 may include various network elements, such as digital telephones, routers and hubs, and computer devices, which may communicate with each other using links in the local networks. Each of the local networks 135 and 145 may also include one or more gateway devices that provide interfaces to the PSTN 110. As illustrated in the example of FIG. 1, the local network 135 includes a gateway 130 that is connected to four telephone lines provided by the PSTN 110. Similarly, the local network 145 includes a gateway 140 that is connected to three telephone lines provided by the PSTN 110, and a gateway 142 that is connected to one telephone line provided by the PSTN 110. Local networks 135 and 145 may communicate with other telephones that can be reached through the PSTN 110. In general, each gateway may provide connections between the local network and the PSTN, so that the local networks can make calls to other telephones and devices connected to the PSTN. The gateways in a common local network, such as the gateways 140 and 142, may be coupled to each other. The local networks 135 and 145 may transmit and receive calls through their respective gateways, and through the PSTN 110, to other telephones that may be connected to the PSTN 110.

Figure 2:
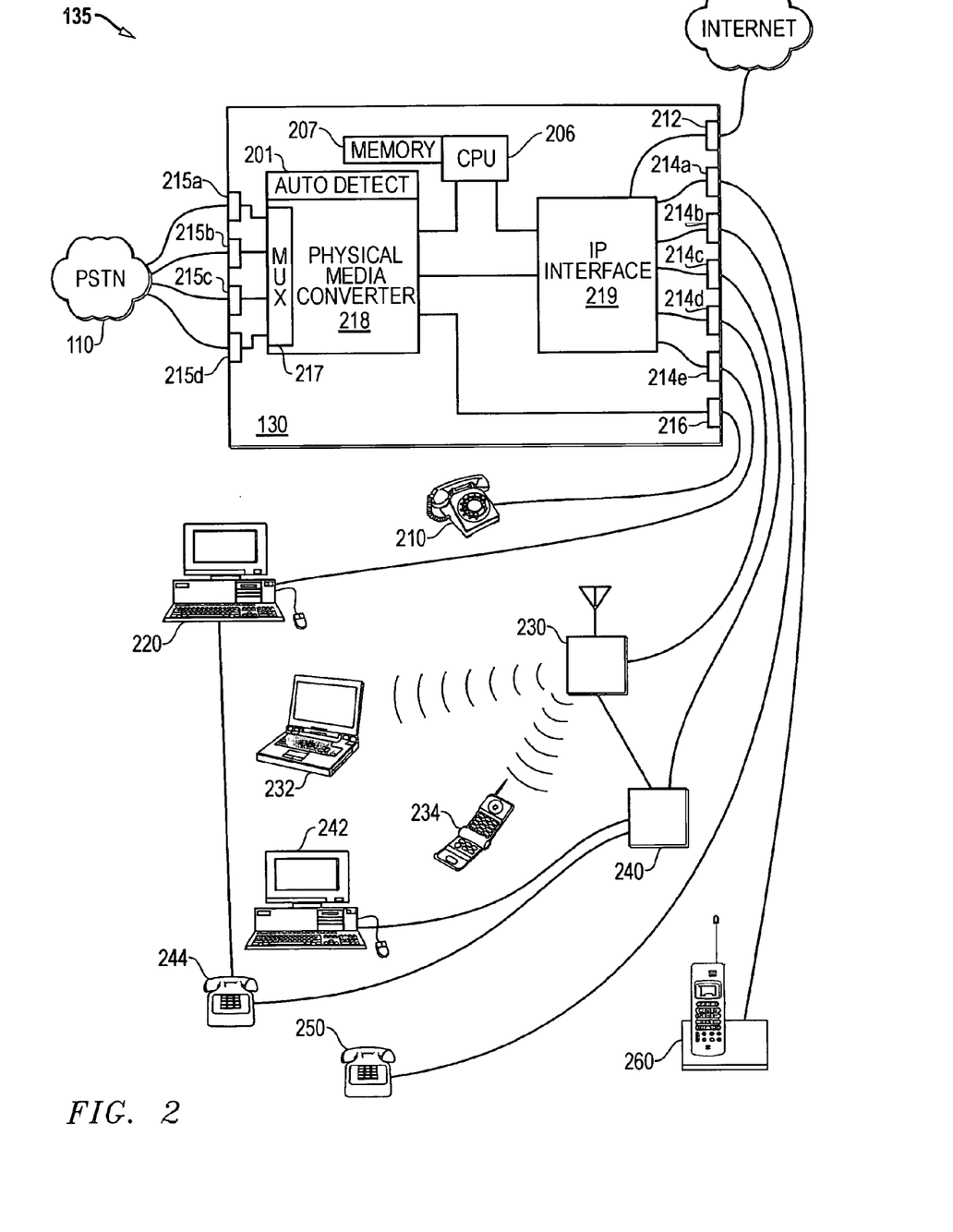
FIG. 2 is a block diagram of one implementation of a local network from FIG. 1.

FIG. 2 is a block diagram of one implementation of the local network 135. In the depicted example, the local network 135 includes the gateway 130, a standard telephone 210, a personal computer 220, a wireless hub 230, a wired router 240, digital telephones 244 and 250, a cordless digital telephone 260, a portable computer 232, a portable digital telephone 234, and a server 242.

In this implementation, the gateway 130 includes four PSTN ports 215(a-d) (which will be collectively referenced below as PSTN ports 215) that may be connected to four separate telephone lines that provide connections to the PSTN 110. The telephone lines may each be a subscriber line provided by a local exchange network with a unique telephone number assigned to it (such as 1-212-555-1234). A subscriber line may be a residential telephone line or a commercial telephone line, and may provide the service of a basic telephone line, an ISDN line, a DSL line, or a T1 line, among others. The gateway 130 may also include five network ports 214(a-e) (which will be collectively referenced below as network ports 214) and one standard telephone port 216. Various network elements may connect with the gateway 130 through ports 214 and 216. The gateway 130 may also be connected to the Internet (or to some other wide area network). As illustrated, a connection through an Internet port 212 may connect the gateway 130 with the Internet.

The network ports 214 and the standard telephone port 216 may be coupled to the PSTN ports 215(a-d) through internal components in the gateway 130. These components may include a physical media converter 218 coupled to the PSTN ports 215, an IP interface 219 coupled to the network ports 214, a processor such as a central processing unit (CPU) 206 coupled to the physical media converter 218 and to the IP interface 219, and a memory 207 coupled to the CPU 206. The gateway 130 may also include an auto-detect module 201, coupled to the physical media converter 218. The memory may include semiconductor storage, magnetic storage, or optical storage, and may be a fixed memory, a removable memory, or combinations thereof. Additional connections in the gateway 130 may include a direct connection between the physical media converter 218 and the IP interface 219, and a connection between the standard telephone port 216 and a multiplexer circuit 217 in the physical media converter 218.

Various network links may be used among the network elements in the local network 135. For example, as shown n FIG. 2, the standard telephone 210 may be plugged into standard telephone port 216. The personal computer 220 may be connected to network port 214(e). The wireless hub 230 may be connected to network port 214(d). The wired router 240 may be connected to network port 214(c). The digital telephone 250 may be connected to network port 214(b). The cordless digital telephone 260 may be connected to network port 214(a). As depicted, the network ports 214 are wired ports and connect to the network elements through wires or cables. Alternatively, some or all of the network ports 214 may be wireless ports and may connect to the network elements through wireless links such as radio or infrared links.

The local network 135 may also include other links, such as radiating hub-and-spoke links. For example, the portable computer 232 and the portable digital telephone 234 may be connected with the wireless hub 230 through wireless links. The server 242 and the digital telephone 244 may be connected with the wired router 240 through twisted-pair links. Additional links, and even redundant links, may also be provided among various network elements. For example, direct links may be provided between the personal computer 220 and the digital telephone 244, and between the wireless hub 230 and the wired router 240.

The local network 135 may provide customized local telephone service to a user. Such service may be useful, for example, in a small office or a home office environment, where an owner or administrator wishes to allow inter-office communication among various employees without relying on a PSTN. A system such as the local network 135 may also provide users with connectivity to the PSTN 110 when needed for communications that reach outside the local environment. The local network 135 may be an IP telephone system that uses internet-related protocols such as the transmission control protocol (TCP) and the user datagram protocol (UDP) to convey voice signals among telephones through a digital network. In other implementations of the local network, one or more links may use other forms of digital communications, or may use analog communications.

An element in the local network 135 may use a direct link, or a routed link, or a connection through the gateway 130, or a combination thereof, to communicate with other elements in the local network 135—without requiring the use of the PSTN 110. For example, a caller may wish to use a headset connected to the portable computer 232 to make a telephone call to a recipient who is carrying the cordless digital telephone 260. To initiate the call, the caller may use a keypad on the portable computer 232 to enter an extension number or other identifier for the cordless digital telephone 260. Alternatively, depending upon the system implementation, the caller may enter a personal identifier for the recipient holding the digital telephone 260. The local network 135 may then provide a connection between the portable computer 232 and the cordless digital telephone 260. This connection may utilize the wireless link from portable computer 232 to wireless hub 230, the link from wireless hub 230 to the gateway 130, a connection in the gateway from the port 214(d) through the IP interface 219 to the port 214(a), and the link from the gateway 130 to the cordless digital telephone 260.

To communicate with a telephone outside the local network 135, a device in the local network may use the gateway 130 to reach the PSTN 110, through which a connection may be made with the destination telephone. For example, the local network may connect a user of the cordless digital telephone 260 to an outside telephone line by using the link between the cordless digital telephone 260 and the gateway 130, which may then establish a connection with one of the telephone lines coupled to the PSTN ports 215.

To establish a connection between a telephone line coupled to one of the PSTN ports 215 and a local device coupled to one of the network ports 214, the gateway 130 may perform several internal format conversions and internal connections. The multiplexer 217 may be used to select an available port among PSTN ports 215(a-d). The physical media converter 218 may be used to translate incoming telephone signals to and from internal digital data. To assist with such conversions, the physical media converter 218 may include an FXO converter, an FXS converter, a PRI converter, a BRI converter, a T1 converter, or a T3 converter, among others, or combinations thereof. The IP interface 219 may convert the internal digital data to and from packetized data appropriate for communication among elements of the local network 135. These operations may be overseen and assisted by the CPU 206, with data stored as needed in the memory 207.

The standard telephone port 216 may be connected to the standard telephone 210 using a POTS telephone wire. The standard telephone 210 may thus provide a backup service through which users may access a PSTN in the event of failure of components of the digital network. The standard telephone port 216 may also be used to connect a fax machine or other standard telephone device to the gateway 130. The standard telephone port 216 may be internally coupled to the multiplexer 217, which may select an available telephone line as needed and as available for use by devices coupled to the standard telephone port 216.

The physical media converter 218 may be configured to detect and receive, as well as create and transmit, telephone signals appropriate for communication through the PSTN 110. The physical media converter 218 may be coupled with the IP interface 219 either directly, or through a CPU, or both (as illustrated in FIG. 2). The IP interface 219 may be adapted to receive and transmit digital signals appropriate for communication among elements of the local network 135 through the network ports 214.

A user involved with the setup of the local network 135 may need to connect several telephone wires or other connectors to the gateway 130. The user may connect the gateway 130 to the various network elements through the IP interface ports 214. If the user also wishes to make use of a standard telephone device, such as a fax machine or the standard telephone 210, the user may connect the standard telephone device to the standard telephone port 216. The user may also enable connectivity to the Internet by connecting the gateway 130 to the Internet using the Internet port 212. Further, the user may connect one or more available telephone lines to the PSTN ports 215.

The connections to PSTN ports 215 merit some additional observations. In order for devices in the local network 135 to make best use of the telephone lines connected to PSTN ports 215, the gateway 130 needs to know the telephone numbers that correspond to each of the telephone lines. Consider an example where a user dialing through digital telephone 250 wishes to make an outgoing call on a particular telephone line. In this example, four different telephone lines may be connected to the local network 135 through ports 215(a-d): 555-1231, 555-1232, 555-1233, and 555-1234. Depending on an office rule, or on personal preference, the user may wish to use a particular one of these lines: 555-1234. The user may indicate this preference using a line-selection button on the digital telephone 250, which would convey the preference to gateway 130. Gateway 130 may then select an appropriate PSTN port-either 215(a), or 215(b), or 215(c), or 215(d)—to ensure that the user's outgoing call is placed on the telephone line whose telephone number is 555-1234.

To make this selection, the gateway 130 may refer to information stored in the memory 207. The information may include a lookup table or other data structure that records telephone numbers corresponding to the various PSTN ports on the gateway. The gateway 130 may use this information to determine which PSTN port—either 215(a), or 215(b), or 215(c), or 215(d)—corresponds to which of the four available telephone numbers-either 555-1231, or 555-1232, or 555-1233, or 555-1234.

This information regarding the telephone numbers for the various ports may be entered manually by a user who physically connects the gateway with the telephone lines. When the user makes these connections, for example by plugging the telephone lines into the PSTN ports 215(a-d), the user may use a keypad or some other interface (not shown) on the gateway 130 to inform the gateway of the telephone numbers that correspond to each of the PSTN ports 215(a-d). Such a manual entry of the information, however, requires the user to know what the available telephone numbers are, and to be aware of which telephone numbers correspond to which physical wires for each telephone line. Further, this manual entry may be time consuming. Still further, this manual entry may require some familiarity with the interface for the gateway 215, which may take some time to develop for new users. All of these factors may reduce the "user friendliness" of the gateway 215. These factors may further present greater difficulty in situations where the gateway is connected to large numbers of telephone lines (which may be substantially greater than four, depending on the implementation of the devices), or in situations where multiple gateways are used in tandem to connect with many telephone lines. Difficulties may also arise in situations where only few (or one) telephone lines are used, but the user is unfamiliar with telephony systems. Thus, gateway 130 may be configured to use a remote server to automatically determine the telephone number associated with one or more of the PSTN ports 215(a-d). The remote server may be accessed through the PSTN ports 215 under the operation of the auto-detect module 201.

Figure 3:
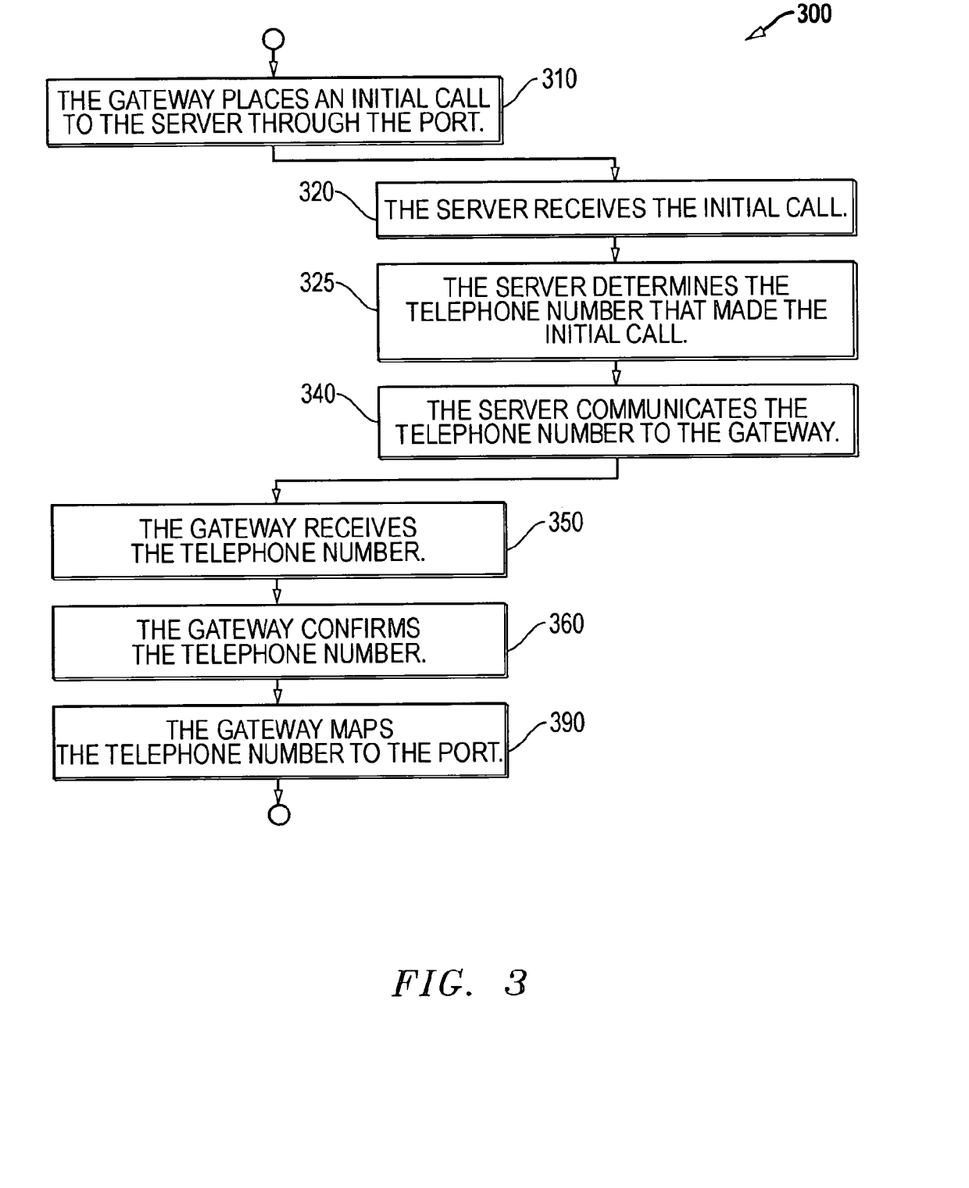
FIG. 3 is a flow diagram of one implementation of a procedure for automatic detection of a telephone number assigned to a telephone line.

FIG. 3 is a flow diagram of one implementation of a procedure 300 for automatic detection of a telephone number assigned to a telephone line. The procedure 300 may be used by a gateway device, such as the gateway 130 from FIGS. 1 and 2. The gateway device may include a dedicated module, such as the auto-detect module 201 from FIG. 2, to coordinate the procedure 300. The procedure 300 may be used during an initial setup or deployment of a gateway, or after changes have been made to the telephone lines connected to a gateway. This procedure may be repeated for each of the ports, such as the PSTN ports 215, coupled to a telephone line.

The procedure 300 commences in act 310, where the gateway places an initial call to a remote server through a selected port. The remote server may be a centralized server, such as one of the ID servers 120 and 122 depicted in FIG. 1, configured to cooperate with a requesting gateway to execute the procedure 300. The gateway may be pre-programmed with telephone numbers for accessing one or more remote servers. Alternatively, the gateway may obtain a telephone number for the remote server from a user, or from an information provider reached through a pre-programmed telephone number or Internet address. More information on the remote server is provided below.

In act 320, the remote server receives this initial call from the gateway. In act 325, the remote server captures the telephone number of the telephone line on which this initial call was placed. The capturing is performed by detecting and recording the caller ID information. This determination may be made by monitoring the caller ID information received with the initial call. At this point, the remote server has determined the telephone number of the telephone line that was used by the gateway to make this initial call. In general, it is not necessary for the remote server to actually answer the incoming call in order to make this determination, since the caller ID information may be detected without actually answering the telephone call.

In act 340, the remote server communicates with the gateway and informs the gateway of the telephone number that was captured in act 325. This communication may be made using a variety of techniques. For example, the remote server may answer the initial telephone call and use the resulting telephone connection to relay the captured telephone number back to the gateway. Alternatively, the remote server may place a return telephone call to the gateway (using the captured telephone number) and use the resulting telephone connection to relay the captured telephone number back to the gateway. Other alternatives are also envisioned, including further examples described below.

The gateway receives the telephone number from the remote server, as indicated in act 350. The gateway may confirm the received telephone number in act 360. This confirmation may be performed using a variety of techniques. For example, the acts 310-350 may be repeated one or more times, using the same or a different remote server, to confirm that the received telephone number is correct. Alternatively, the gateway may make a network link with the remote server, such as a connection through the Internet (or some other wide area network), to confirm that the received telephone number is correct. Variations of the method 300 may use different techniques, or combinations thereof, for the confirmation in act 360. Alternatively, some variations of the method 300 may not perform the confirmation of act 360.

In act 390, the gateway may use the telephone number received from the remote server in act 350 to specify the identity of the port that was used to place the initial call in act 310. This specifying may be done by mapping the received telephone number to the port in a lookup table or other data structure in a memory, such as the memory 207. The telephone number may then be used to support the operation of a local network. This information may be used so that the gateway can be aware of the telephone numbers assigned to each of the various PSTN ports. The gateway may then use this information to select an appropriate port for a user who wishes to make an outgoing call using a specific telephone number, or to ascertain the telephone number of an incoming call in situations where caller ID information is faulty or is not available. The acts 310-390 may be repeated by a gateway for each PSTN port on the gateway.

The above discussion of the procedure 300 is made with reference to the gateway 130 from FIGS. 1 and 2. When used with the gateway 130, the procedure 300 may be executed by a dedicated module, such as the auto-detect module 201 from FIG. 2, to coordinate the procedure 300. Alternatively, the procedure 300 may be executed by a processor running appropriate instructions from software stored in a memory. Thus, the auto-detect module 201 in FIG. 2 may be replaced by (or implemented as) the CPU 206, using computer instructions stored in the memory 207 for performing the acts of the procedure 300. Variations of the procedure 300 are also contemplated. Variations of the gateway 130 or other devices and systems may also use the procedure 300, or variations thereof, to perform automatic detection.

Figure 4:
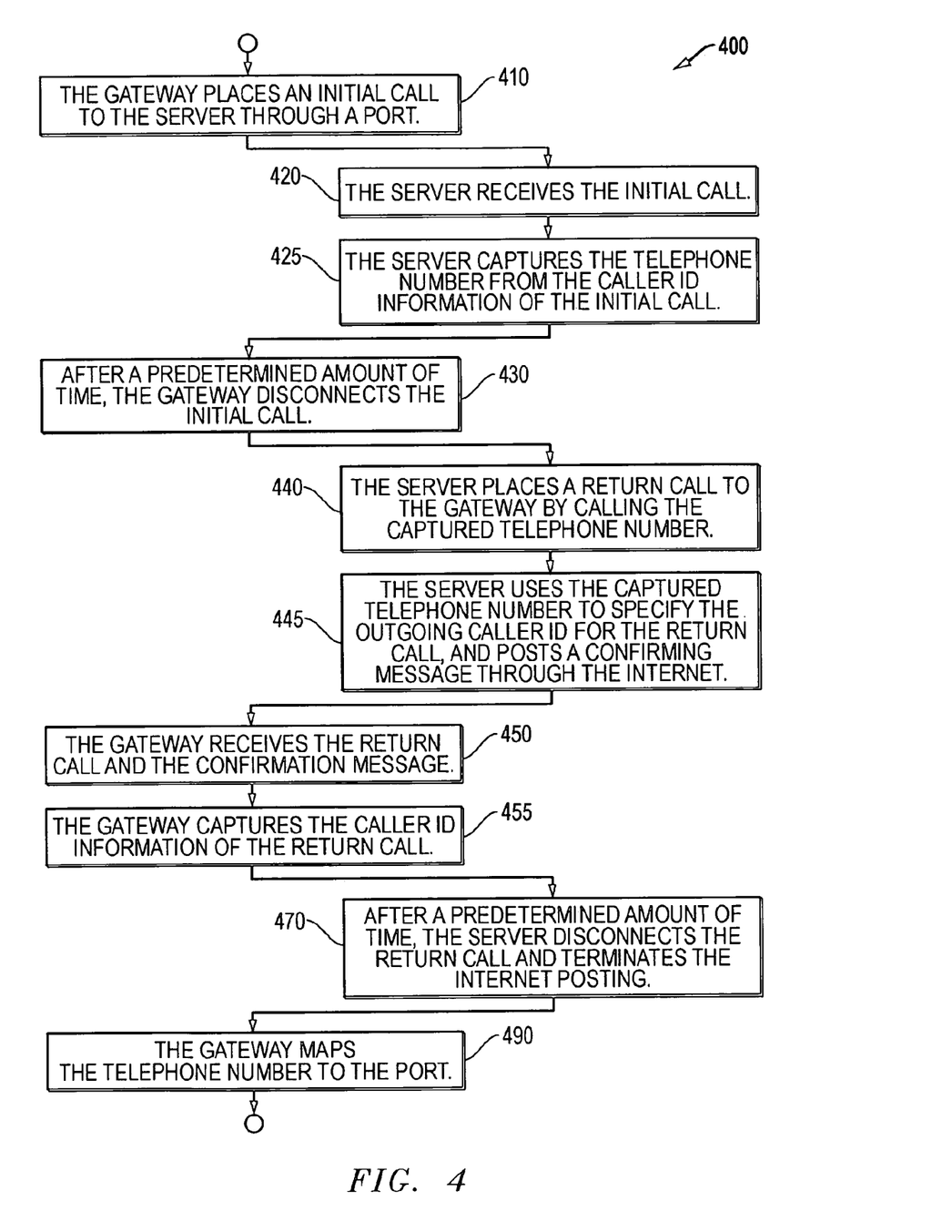
FIG. 4 is a flow diagram of a second implementation of a procedure for automatic detection of a telephone number assigned to a telephone line.

FIG. 4 is a flow diagram of a second implementation of a procedure 400 for automatic detection of a telephone number assigned to a telephone line. The procedure 400 may be repeated for each port that is coupled to a telephone line. As discussed below, this embodiment of the procedure uses caller ID tools for bidirectional communication of information, and provides confirmation of the information by using the Internet as a parallel communications medium.

The procedure 400 commences in act 410, where the gateway places an initial call to a remote server through a selected port. In act 420, the remote server receives this initial call from the gateway. In act 425, the remote server monitors the caller ID information of the incoming call. The remote server captures the caller ID information and thus determines the telephone number of the telephone line on which this call has been placed. At this point, the remote server has determined the telephone number of the telephone line that was used by the gateway to make this initial call. In general, it is not necessary for the remote server to actually answer the incoming call, since the caller ID information may be captured without actually answering the telephone call.

In act 430, after a predetermined amount of time has elapsed since initiating the initial call, the gateway disconnects the initial call. At this point, the initial call has been terminated without having actually been answered. Thus, at this point, the gateway has not received any information that assists in identifying the telephone number associated with the port used to make the initial call. However, that telephone number has been determined and recorded by the remote server.

In act 440, the remote server places a return call to the gateway. The remote server places this call by dialing the telephone number that was captured during the initial incoming call. The remote server thus contacts the gateway through the same telephone number that was used for the initial call made by the gateway. During this return call, the remote server informs the gateway of the telephone number that was used during the initial telephone call.

To more readily provide this telephone number information to the gateway, the remote server may encode this telephone number into the outgoing caller ID information for the return call, as noted in act 445. Thus, the remote server may set the outgoing caller ID information for the return call to be the same telephone number that was captured earlier in act 425. Although caller ID information is normally dictated by a local exchange carrier, in some situations individual users may be allowed to dictate the caller ID information of an outgoing call. Such capabilities may be available, for example, to users who subscribe to PRI level service. Thus, the ID servers 120 and 122 may be connected to the PSTN by subscribing to PRI-class telephone service in order to provide this feature.

In act 445, the remote server also provides a redundant confirmation message for the gateway. The remote server posts the captured telephone number in a confirming message on an Internet site, from which the gateway may download the captured telephone number.

The return call is received by the gateway in act 450. The gateway monitors the incoming return call for caller ID information and captures the caller ID information of this return call in act 455. The gateway thus discovers the telephone number of the telephone line with which it made its initial outgoing call. It is noted that the gateway may capture the caller ID information of the return call without actually answering the return call. The return call may then be terminated by the remote server.

In act 450, the gateway may also confirm the captured telephone number by downloading the confirming message from the Internet site used by the remote server in act 445. If the captured telephone number matches the telephone number in the confirming message, then the gateway may ascertain that the captured telephone number is the correct information. If these numbers do not match, the gateway may re-initiate the procedure 400 for the selected port.

The confirming message posted by the remote server in act 445 may be posted in a public or private forum to which the gateway would be expected to have access. For example, the confirming message may be posted on the World Wide Web or on a file transfer site. The gateway may access the forum through a port with an Internet connection, such as the Internet port 212. The gateway may be equipped with predetermined information on the location of the posting forum.

The confirming message posted on the Internet site may be helpful to avoid errors. For example, instead of receiving the return call from the remote server in act 450, the gateway may by chance receive a call from some other entity. In such a situation, the gateway would capture erroneous caller ID information in act 450. The gateway may detect this error by comparing the captured telephone number with the telephone number posted in the confirming message on the Internet.

After the gateway captures the caller ID information of the return call in act 455, the return call may be terminated. The remote server may disconnect or hang up the return call in act 470 after a predetermined amount of time has elapsed from the initiation of the return call in act 440. (Alternatively, the gateway may terminate the return call by electronically answering the call and immediately hanging up.) In act 490, the captured and confirmed telephone number may be mapped in memory to the port that was used for the initial outgoing call in act 410.

A variety of alternatives are envisioned for the procedure 400. For example, in one alternative, the procedure may require that the return call in act 450 be received within a predetermined time period after the initial call is generated. This timing may help ensure that the received call is the return call from the remote server, and not an unrelated call from an unrelated party.

In another alternative of the procedure the gateway may answer the return call in act 450. The gateway may then communicate directly with the remote server to learn the telephone number captured by the remote server.

In yet another alternative of the procedure, the remote server may answer the initial call in act 425. Such an alternative may be useful in a situation where the initial call reaches the server through a toll-free telephone number. The remote server and the gateway may then share information in a single telephone call, thereby obviating the subsequent return call and confirmation measures.

These variations and others may be implemented depending on various design considerations, such as the expected cost differential between answered calls and unanswered calls, the cost of direct communication between the remote server and the gateway, the cost of making and detecting postings on the Internet, and the costs of hardware associated with implementing the various alternatives.

The remote server may use various security features to protect the confirming message posted on the World Wide Web or other posting forum. The confirming message may be protected by an access password or by encryption. To access the confirming message, the gateway may be equipped with any required password or decryption information. For example, a common password may be used for all confirming messages, and each gateway may be manufactured with pre-loaded information that includes the common password. Alternatively, the remote server may enhance security by using individualized passwords (or individualized encryption keys) for each confirming message. The individualized passwords may be based in part (or completely) on the telephone number being posted. For example, the individualized password may include the last four digits of the telephone number being posted. Similarly, the individualized password may be a one-way hash of the telephone number being posted. In such examples, the gateway would be able to access the confirming message only after capturing the telephone number in act 455. Instead of, or in addition to, using the telephone number to be posted, the gateway may base an individualized password on a timestamp of the initial call and/or the return call.

It is noted that the confirming message posted on the Internet in act 455 is a broadcast communication. By reading the confirming message itself, a gateway may not know with certainty if the confirming message is intended for that gateway, since the confirming message may have been intended for some other gateway. Thus, the confirming message may not by itself provide enough information to enable a gateway to determine the telephone number under question. This ambiguity is generally resolved by the return call received in act 450, since the return call is, in general, a point-to-point communication. However, this ambiguity may be resolved by other means, such as the use of time stamps in the confirming message, or through the use of temporary postings of the confirming message coupled with strict timing of the acts in the procedure 510. Thus, the procedure 400 may be modified so that acts 445 and 450 use the confirming message on the Internet without an accompanying return call.

Figure 5:
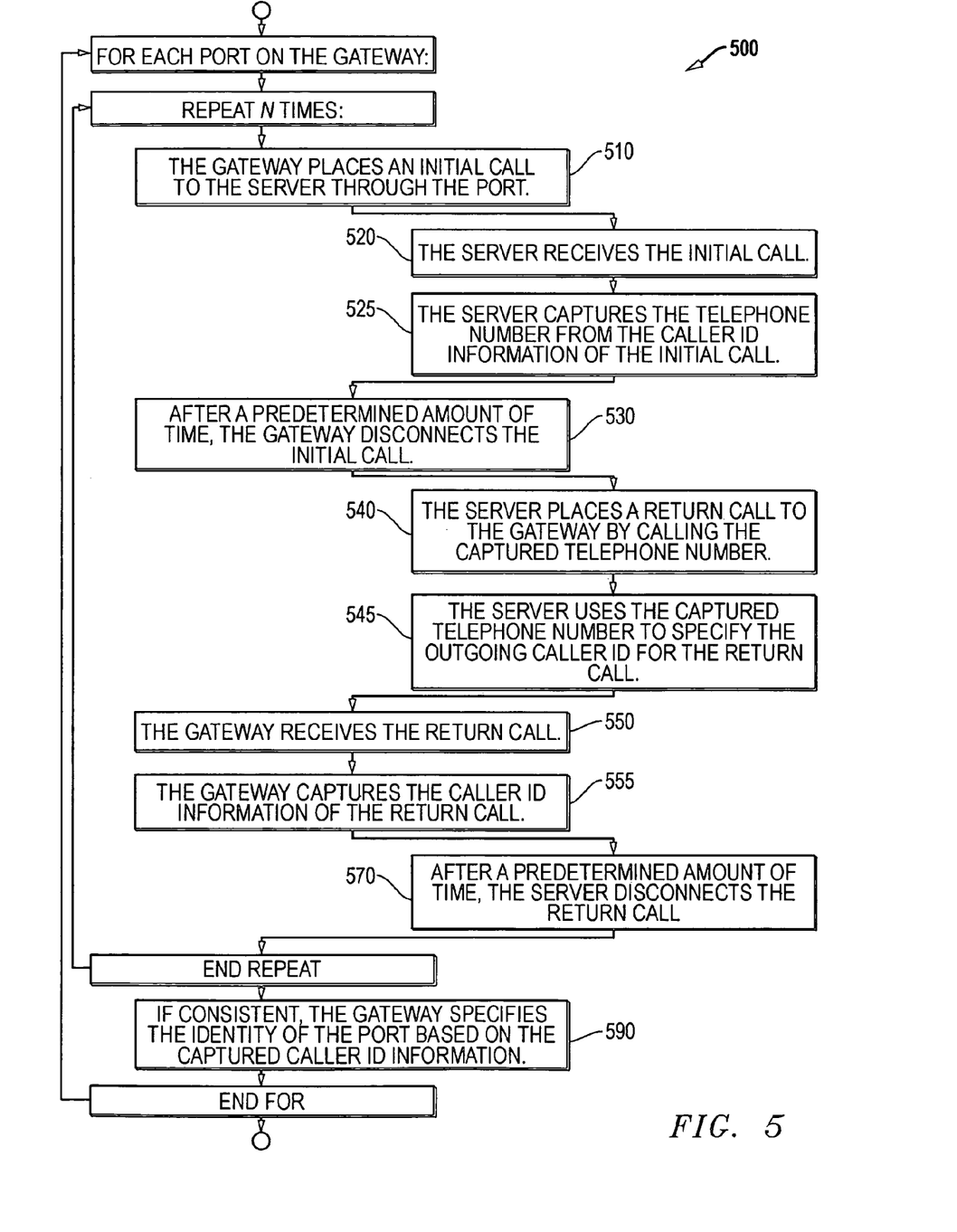
FIG. 5 is a flow diagram of a third implementation of a procedure for automatic detection of a telephone number assigned to a telephone line.

FIG. 5 is a flow diagram of a third implementation of a procedure 500 for automatic detection of a telephone number assigned to a telephone line. As discussed below, this embodiment of the procedure uses caller ID tools for bidirectional communication of information, and provides confirmation of the information through repetition.

As indicated by the outer loop in the flow diagram, the procedure may be performed for each of the different ports on the gateway, selecting one or more ports at a time. To provide confirmation of the automated detection, the procedure may be repeated several times for each single port, as indicated by the inner loop in the flow diagram. This repetition may be done for a fixed number "N" of times, or may be repeated enough times to confirm that the detected telephone number is consistent with previous repetitions.

Each iteration in the procedure 500 commences in act 510, where the gateway places an initial call to a remote server through the selected port. In act 520, the remote server receives this initial call from the gateway. In act 525, the remote server monitors the caller ID information of the incoming call. The remote server captures the caller ID information and thus determines the telephone number of the telephone line on which this call has been placed. In act 530, after a predetermined amount of time has elapsed since initiating the initial call, the gateway disconnects the initial call.

In act 540, the remote server places a return call to the gateway by dialing the telephone number that was captured during the initial incoming call. As indicated in act 545, the remote server sets the outgoing caller ID information for the return call to be the same telephone number that was captured earlier in act 525.

The return call is received by the gateway in act 550. The gateway monitors the incoming return call for caller ID information and captures the caller ID information of this return call in act 555. The gateway thus obtains a candidate number of the telephone line with which it made its initial outgoing call. At this point in the first repetition, the candidate number has not been confirmed. The remote server may disconnect or hang up the return call in act 570 after a predetermined amount of time has elapsed since the return call was initiated in act 540.

As noted above, the acts 510-570 may be repeated several times for each port to confirm the candidate telephone number. These acts are repeated (at least one repetition) to obtain two or more candidate telephone numbers. If the candidate telephone numbers are consistently the same number, then this consistency may be understood as ruling out the situation in which the candidate number was captured from a call placed by an unrelated caller. The gateway may conclude that a consistently received candidate number is correct. In act 590 the gateway may then map the candidate number in memory to the port that was used for the initial outgoing call in act 510.

Figure 6:
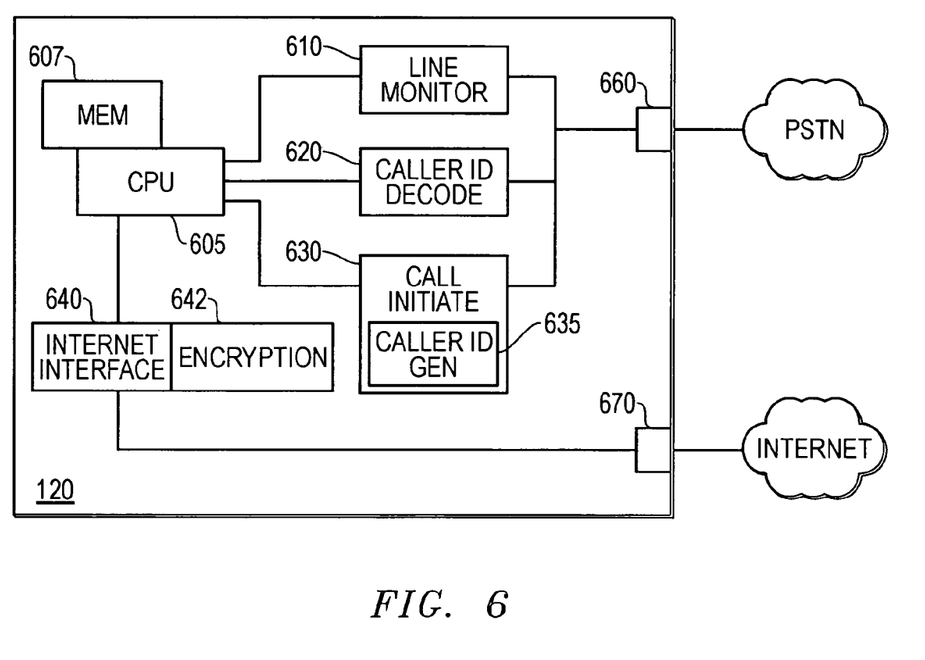
FIG. 6 is a block diagram of one implementation of an ID server from FIG. 1.

FIG. 6 is a block diagram of one implementation of the ID server 120 from FIG. 1. The ID server 120 may be used by the procedures described in FIGS. 3-5 to assist a gateway in determining the telephone numbers assigned to telephone lines connected to the gateway. The ID server 120 may include various components, including a CPU 605, a memory 607, an Internet interface 640, and encryption module 642, an Internet port 670, a line monitor 610, a caller ID decoder 620, a call initiator 630, a caller ID generator 635, and a PSTN port 660. The components may be implemented using various combinations of software and hardware, such as various forms of computer programs and semiconductor devices, as appropriate for various design implementations.

The PSTN port 660 may make and receive calls on a PSTN. The Internet port 670 may transmit and receive information to and from the Internet or another wide area network. The Internet interface 640 may be coupled with the CPU 605 and with the Internet port 670, and may convey information transmitted and received through the Internet port 670 to the CPU 605. The encryption module 642 may assist the Internet interface 640 by providing encryption (or password protection) for messages to be posted in a publicly accessible forum. The CPU may also be coupled to the memory 607. The line monitor 610, the caller ID decoder 620, and the call initiator 630 may each be coupled to the CPU 605 and to the PSTN port 660. The line monitor 610 may be configured to detect incoming calls on the PSTN port 660. The caller ID decoder 620 may be configured to detect and decode the caller ID information of incoming calls on the PSTN port 660. The call initiator 630 may be configured to place outgoing calls on the PSTN port 660. The caller ID generator 635 may be coupled to the call initiator 630 and may be configured to dictate the caller ID information associated with an outgoing call.

Under control of software stored in the memory 607, the CPU may control the Internet interface 640, the line monitor 610, the caller ID decoder 620, and the call initiator 630, and may process information to be conveyed through these components and the ports 660 and 670. The software and the components of the ID server 120 may be configured so that the ID server 120 performs server-side aspects of procedures such as the procedures 300, 400, or 500, or variations thereof.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method for port identification comprising acts of:
   generating an outgoing call on a first communications port among a plurality of communications ports, wherein
      the first communications port is coupled to a telephone line, and
      the outgoing call is directed to a server;
   detecting an incoming call on the telephone line at the first communications port;
   determining a caller identifier of the incoming call; and
   automatically mapping the caller identifier to the first communications port, wherein the mapping comprises
      determining a telephone number from the caller identifier, and
      recording the telephone number as a telephone number of the telephone line.

2. The method of claim 1, wherein:
   the detecting the incoming call comprises detecting the incoming call within a predetermined time period after the generating an outgoing call;
   the first communications port has an associated port identity; and
   the caller identifier represents the port identity.

3. The method of claim 1, comprising:
   confirming the caller identifier.

4. The method of claim 3, wherein the confirming the caller identifier comprises:
   detecting a confirmation incoming call on the first communications port;
   determining a confirmation caller identifier the confirmation incoming call; and
   verifying that the confirmation caller identifier matches the caller identifier.

5. The method of claim 3, wherein the confirming the caller identifier comprises:
   detecting a plurality of confirmation incoming calls on the first communications port;
   determining a plurality of confirmation caller identifiers of the confirmation incoming calls; and
   verifying that the plurality of confirmation caller identifier match the caller identifier.

6. The method of claim 3, wherein the confirming the caller identifier comprises:
   generating an outgoing confirmation call on the first communications port;
   detecting an incoming confirmation call on the first communications port;
   determining a confirmation caller identifier of the incoming confirmation call; and
   verifying that the confirmation caller identifier matches the caller identifier.

7. The method of claim 3, wherein the confirming the caller identifier comprises:
   (a) generating an outgoing confirmation call on the first communications port;
   (b) detecting an incoming confirmation call on the first communications port;
   (c) determining a confirmation caller identifier of the incoming confirmation call;
   (d) verifying that the confirmation caller identifier matches the caller identifier; and
   (e) repeating acts (a)-(e) a predetermined number of times.

8. A method comprising acts of:
generating an outgoing call on a communications port;
detecting an incoming call on the communications port;
determining a caller identifier from the incoming call;
mapping the caller identifier to the communications port; and
confirming the caller identifier, wherein the confirming the caller identifier comprises:
communicating with a server through a second communications port after the generating an outgoing call; and
in response to communicating with the server through the second communications port, determining that the server generates the incoming call.

9. The method of claim 8, wherein the determining that the server generates the incoming call comprises determining that the server generates a call simultaneous with the incoming call.

10. The method of claim 8, wherein the communicating with the server through the second communications port comprises communicating with the server through the Internet.

11. The method of claim 8, wherein the communicating with the server through the second communications port comprises communicating with the server through an intranet.

12. A system comprising:
a plurality of communications ports;
a memory; and
a processor, wherein the processor is configured to:
place an initial telephone call through a telephone line coupled to a first communications port among the plurality of communications ports, wherein the initial telephone call is directed to a server,
determine a port identification based on caller ID information of
a call received at the first communications port subsequent to the initial telephone call,
the port identification in the memory in association with the first communications port.

13. The system of claim 12, wherein:
the first communications port is a telephone port configured to be coupled to a public switched telephone network.

14. The system of claim 12, wherein the processor is configured to confirm the port identification.

15. The system of claim 12, wherein the processor is configured to:
detect a confirmation port identification through the first communications port; and
verify that the confirmation port identification matches the port identification.

16. The system of claim 12, wherein the processor is configured to:
detect a plurality of confirmation port identifications through the first communications port; and
verify that the plurality of confirmation port identifications match the port identification.

17. A system comprising:
a communications port;
a memory; and
a processor, wherein the processor is configured to:
place an initial telephone call through the communications port,
receive a port identification through the communications port in response to the initial telephone call,
store the port identification in the memory in association with the communications port, and
communicate with a server through a second communications port to confirm that the server transmitted the port identification.

18. A system comprising:
a communications port;
a memory; and
a processor, wherein the processor is configured to:
place an initial telephone call through the communications port,
receive a port identification through the communications port in response to the initial telephone call,
store the port identification in the memory in association with the communications port, and
communicate securely with a server through the Internet to confirm that the server transmitted the port identification.

19. The system of claim 12, wherein the memory includes software configured to direct operations of the processor.

20. A system comprising:
a communications port; and
a processor, wherein the processor is configured to:
detect an incoming telephone call on the communications port,
detect an incoming caller ID information of the incoming telephone call
initiate an outgoing telephone call on the communications port with the incoming caller ID information set as an outgoing caller ID information for the outgoing telephone call, and
initiate a confirming outgoing telephone call on the communications port.

21. A system comprising:
a communications port; and
a processor, wherein the processor is configured to:
detect an incoming telephone call on the communications port,
detect an incoming caller ID information of the incoming telephone call initiate an outgoing telephone call on the communications port with the incoming caller ID information set as an outgoing caller ID information for the outgoing telephone call, and
initiate a plurality of confirming outgoing telephone calls on the communications port.

22. A system comprising:
a communications port; and
a processor, wherein the processor is configured to:
detect an incoming telephone call on the communications port,
detect an incoming caller ID information of the incoming telephone call
initiate an outgoing telephone call on the communications port with the incoming caller ID information set as an outgoing caller ID information for the outgoing telephone call, and
post a confirmation of the outgoing telephone call at a data location.

23. The system of claim 22, wherein the data location is an Internet site.

24. The system of claim 22, wherein the data location is an intranet site.

25. The system of claim 22, wherein the posted confirmation is also a secure confirmation.

26. A system comprising:
a plurality of communications ports;
a memory;
means for placing an initial telephone call through a telephone line coupled to a first communications port among the plurality of communications ports, wherein the initial telephone call is directed to a server, means for determining a port identification based on caller ID information of
 a call received at the first communications port subsequent to the initial telephone call, and means for storing the port identification in the memory in association with the first communications port.

27. The method of claim 1, wherein the mapping comprises:
 storing the caller identifier in a memory coupled to the first communications port; and
 storing, in the memory, an association between the caller identifier and the first communications port.

28. The method of claim 1, wherein the determining the caller identifier is performed without answering the incoming call.

29. The system of claim 13, wherein the processor is configured to receive the port identification without answering the return call.

30. The system of claim 26, wherein:
 the means for receiving the port identification is configured to receive the port identification as caller ID information of a return telephone call detected subsequent to the initial telephone call; and
 the means for receiving the port identification is configured to receive the port identification without answering the return telephone call.

31. The method of claim 1, wherein the determining a caller identifier comprises:
 detecting a caller ID that identifies a caller of the incoming call; and
 setting the caller identifier to be the detected caller ID information.

32. The method of claim 1, comprising:
 confirming that the incoming call was initiated by the server.

\* \* \* \* \*